United States Patent
Terashima et al.

(10) Patent No.: US 8,592,033 B2
(45) Date of Patent: Nov. 26, 2013

(54) PRESSURE-SENSITIVE ADHESIVE TAPE FOR BATTERY AND BATTERY USING THE PRESSURE-SENSITIVE ADHESIVE TAPE FOR BATTERY

(75) Inventors: Tadashi Terashima, Osaka (JP); Mitsuru Kamitani, Osaka (JP); Masaaki Sato, Osaka (JP)

(73) Assignee: Nitto Denko Corporation, Osaka (JP)

( * ) Notice: Subject to any disclaimer, the term of this patent is extended or adjusted under 35 U.S.C. 154(b) by 896 days.

(21) Appl. No.: 12/714,816

(22) Filed: Mar. 1, 2010

(65) Prior Publication Data

US 2010/0221585 A1 Sep. 2, 2010

(30) Foreign Application Priority Data

Mar. 2, 2009 (JP) .................................. 2009-047570

(51) Int. Cl.
*B32B 7/12* (2006.01)
(52) U.S. Cl.
USPC .......................................................... 428/343
(58) Field of Classification Search
USPC .......................................................... 428/343
See application file for complete search history.

(56) References Cited

FOREIGN PATENT DOCUMENTS

JP   10-247489 A   9/1998

*Primary Examiner* — Victor Chang
(74) *Attorney, Agent, or Firm* — Sughrue Mion, PLLC

(57) ABSTRACT

The present invention provides a pressure-sensitive adhesive tape for battery, which includes a substrate and a pressure-sensitive adhesive applied on at least one surface of the substrate, in which the pressure-sensitive adhesive is applied on a part of the substrate, and in which either one of a portion at which the pressure-sensitive adhesive is applied and a portion at which the pressure-sensitive adhesive is not applied has a degree of haze of more than 15%, and the other one of said portions has a degree of haze of 15% or less.

6 Claims, 2 Drawing Sheets

PRESSURE-SENSITIVE ADHESIVE TAPE FOR BATTERY AND BATTERY USING THE PRESSURE-SENSITIVE ADHESIVE TAPE FOR BATTERY

FIELD OF THE INVENTION

The present invention relates to a pressure-sensitive adhesive tape for battery, which is used, for example, as an insulating or protecting material of a battery electrode, and required to accurately confirm a position at which the tape is attached, and a battery using the pressure-sensitive adhesive tape for battery.

BACKGROUND OF THE INVENTION

When a pressure-sensitive adhesive tape is attached to a battery electrode in order to insulate or protect the battery electrode, the effect of insulating or protecting the battery electrode decreases in the case where a position thereof is deviated. For this reason, after the pressure-sensitive adhesive tape is attached to the battery electrode, the position at which the pressure-sensitive adhesive tape is attached is confirmed by visual observation or a camera. However, when the pressure-sensitive adhesive tape is transparent, it is difficult to confirm the pressure-sensitive adhesive tape itself by the visual observation or the camera, which causes a problem of the occurrence of an oversight or a false operation to result in frequent line stoppage. Further, when the pressure-sensitive adhesive tape is opaque, it becomes difficult to see an adherend to which the tape is attached, and the position at which the pressure-sensitive adhesive tape is attached cannot be confirmed.

Conventionally, for example, the following patent document 1 discloses a pressure-sensitive adhesive tape for preventing a short circuit in the interior of a battery. However, when the pressure-sensitive adhesive tape disclosed in patent document 1 is attached to the adherend, it is easy to see the adherend to which the tape is attached because the pressure-sensitive adhesive tape is transparent. However, it is difficult to confirm the pressure-sensitive adhesive tape itself by the visual observation or the camera, so that it has still remained difficult to confirm the position at which the pressure-sensitive adhesive tape is attached.

Patent Document 1: JP-A-10-247489

SUMMARY OF THE INVENTION

An object of the invention is to provide a pressure-sensitive adhesive tape for battery, in which when a battery electrode is insulated or protected, a position at which the pressure-sensitive adhesive tape is attached is easily confirmed by visual observation or a camera in the case where the pressure-sensitive adhesive tape is attached, and a battery using the pressure-sensitive adhesive tape for battery.

Namely, the present invention provides a pressure-sensitive adhesive tape for battery, which includes a substrate and a pressure-sensitive adhesive applied on at least one surface of the substrate, in which the pressure-sensitive adhesive is applied onto a part of the substrate, and in which either one of a portion on which the pressure-sensitive adhesive is applied and a portion on which the pressure-sensitive adhesive is not applied has a degree of haze of more than 15%, and the other one of said portions has a degree of haze of 15% or less.

The portion at which the pressure-sensitive adhesive is applied onto the substrate (hereinafter referred to as a pressure-sensitive adhesive-coated portion) and the portion at which pressure-sensitive adhesive is not applied (hereinafter referred to as a pressure-sensitive adhesive-non-coated portion) can be made by applying the pressure-sensitive adhesive to a part of the substrate. Of the degrees of haze of the pressure-sensitive adhesive-coated portion and the pressure-sensitive adhesive-non-coated portion, either one is more than 15%, and the other is 15% or less. Accordingly, after the pressure-sensitive adhesive tape is attached to the adherend, it is easy to confirm the position at which the pressure-sensitive adhesive tape is attached.

Further, in one embodiment the invention, the degree of haze of the portion at which the pressure-sensitive adhesive is applied is preferably 15% or less.

In this embodiment, the degree of haze of the portion at which the pressure-sensitive adhesive is applied is preferably 15% or less, more preferably 10% or less, and still more preferably 5% or less. When the pressure-sensitive adhesive is applied on the substrate having a rough surface, the pressure-sensitive adhesive enters concavities on the surface of the substrate to make the surface smooth. Accordingly, the degree of transparency of the pressure-sensitive adhesive-coated portion increases. When the pressure-sensitive adhesive-coated portion having a low degree of haze is provided only on a part of the substrate having a high degree of haze, it becomes easy to confirm the position at which the pressure-sensitive adhesive tape is attached, after the pressure-sensitive adhesive tape is attached to the adherend.

Furthermore, in another embodiment of the invention, the degree of haze of the portion at which the pressure-sensitive adhesive is applied is preferably more than 15%.

In this embodiment, the degree of haze of the portion at which the pressure-sensitive adhesive is applied is preferably more than 15%, more preferably more than 20%, and still more preferably more than 25%. When the pressure-sensitive adhesive-coated portion having a high degree of haze is provided only on a part of the substrate having a low degree of haze, it becomes easy to confirm the position at which the pressure-sensitive adhesive tape is attached, after the pressure-sensitive adhesive tape is attached to the adherend.

Further, in still another embodiment of the invention, the surface roughness Ra of the surface of the substrate to which the pressure-sensitive adhesive is applied is preferably 500 angstroms or more.

In this embodiment, the surface roughness Ra of the surface of the substrate to which the pressure-sensitive adhesive is applied is preferably 500 angstroms or more, more preferably 1,000 angstroms or more, and still more preferably 2,000 angstroms or more. When the pressure-sensitive adhesive is applied on the substrate having a rough surface, the pressure-sensitive adhesive enters concavities on the surface of the substrate to make the surface smooth. Accordingly, the degree of transparency of the pressure-sensitive adhesive-coated portion increases. When such a pressure-sensitive adhesive-coated portion is provided on a part of the substrate, it becomes easy to confirm the position at which the pressure-sensitive adhesive tape is attached, after the pressure-sensitive adhesive tape is attached to the adherend.

Further, according to the invention, the surface of the substrate to which the pressure-sensitive adhesive is applied may have been subjected to a mat processing with a transparent ink.

The degree of haze of the substrate can be controlled by performing a mat processing with a transparent ink on the surface of the substrate to which the pressure-sensitive adhesive is applied.

Furthermore, the invention also provides a battery using the pressure-sensitive adhesive tape for battery of the invention.

The pressure-sensitive adhesive tape for battery of the invention is particularly useful as a pressure-sensitive adhesive tape for battery, which requires that the tape is attached to an accurate position on an adherend for protection or insulation of a battery electrode.

DESCRIPTION OF REFERENCE NUMERALS AND SIGNS

1: Substrate
2: Pressure-sensitive adhesive
3: Adherend
4: Mark
5 Tape-attaching position

DETAILED DESCRIPTION OF THE INVENTION

One embodiment of the invention will be described below with reference to the drawings.

Figure 1:
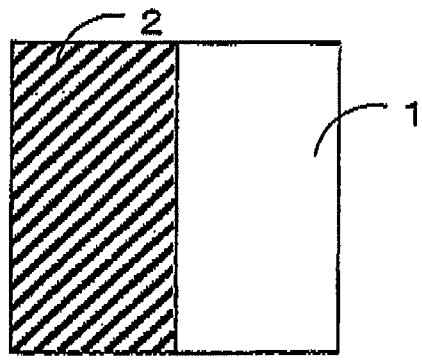
FIG. 1 is a schematic view showing a coated region pattern of a pressure-sensitive adhesive tape for battery according to one embodiment of the invention.

FIG. 1 is a schematic view showing a coated region pattern of a pressure-sensitive adhesive tape for battery (hereinafter referred to as a pressure-sensitive adhesive tape) according to one embodiment of the invention. As shown in FIG. 1, the pressure-sensitive adhesive tape according to this embodiment is constituted by a substrate 1 and a pressure-sensitive adhesive 2 applied to a part of the substrate 1.

The pressure-sensitive adhesive tape for battery of the invention includes a substrate 1 and a pressure-sensitive adhesive 2 applied to at least one surface thereof, in which the pressure-sensitive adhesive 2 is applied to a part of the substrate 1, and in which the degree of haze of either one of a portion at which the pressure-sensitive adhesive 2 is applied and a portion at which the pressure-sensitive adhesive 2 is not applied is more than 15%, and the degree of haze of the other one of these portions is 15% or less. Of the degrees of haze of the pressure-sensitive adhesive-coated portion and the pressure-sensitive adhesive-non-coated portion, either one is more than 15%, and the other is 15% or less. Accordingly, it becomes easy to confirm the position at which the pressure-sensitive adhesive tape is attached, after the pressure-sensitive adhesive tape is attached to the adherend.

A film constituting the substrate 1 is not particularly limited. Examples thereof include porous films of polyesters such as polyethylene terephthalate (PET), polybutylene terephthalate (PBT) and polyethylene naphthalate (PEN), polyvinyl chloride, polypropylene (PP), polyarylates, polyurethanes, polycarbonates, polyamides, polyimides (PT), polyphenylene sulfides (PPS), polyethylene tetrafluoride and the like, composite materials thereof and the like. Above all, polypropylene is preferred because of its chemical resistance, strength and inexpensiveness.

The pressure-sensitive adhesive 2 is not particularly limited as long as it has no adverse influence on battery performance. Examples thereof include rubber-based pressure-sensitive adhesives, acrylic pressure-sensitive adhesives, silicone-based pressure-sensitive adhesives and the like. Above all, pressure-sensitive adhesives having heat meltability are preferred, and particularly, acrylic pressure-sensitive adhesives are preferred.

As the acrylic pressure-sensitive adhesive, there is used, for example, a pressure-sensitive adhesive comprising an acrylic copolymer obtained by polymerizing a main monomer which gives pressure-sensitive adhesiveness and is capable of forming a polymer having a relatively low glass transition temperature (Tg), a comonomer which gives adhesiveness and cohesive force and is capable of forming a polymer having a relatively high glass transition temperature (Tg) and a functional group-containing monomer (monoethylenic unsaturated monomer) which is capable of improving formation of crosslinking points and adhesiveness.

Examples of the main monomers of the acrylic copolymers include acrylic acid alkyl esters such as ethyl acrylate, butyl acrylate, amyl acrylate, 2-ethylhexyl acrylate and octyl acrylate, acrylic acid cycloalkyl esters such as cyclohexyl acrylate, acrylic acid aralkyl esters such as benzyl acrylate, methacrylic acid alkyl esters such as butyl methacrylate and 2-ethylhexyl methacrylate, methacrylic acid cycloalkyl esters such as cyclohexyl methacrylate, methacrylic acid aralkyl esters such as benzyl methacrylate, and the like. Examples of the comonomers include vinyl group-containing compounds such as methyl acrylate, methyl methacrylate, ethyl methacrylate, vinyl acetate, vinyl propionate, vinyl ether, styrene, acrylonitrile and methacrylonitrile, Examples of the functional group-containing monomers include carboxyl group-containing monomers such as acrylic acid, methacrylic acid, crotonic acid, maleic acid, fumaric acid and itaconic acid, hydroxy group-containing monomers such as 2-hydroxyethyl(meth)acrylate, 2-hydroxypropyl (meth)acrylate, 4-hydroxybutyl(meth)acrylate, N-methylolacrylamide and allyl alcohol, tertiary amino group-containing monomers such as dimethylaminoethyl(meth) acrylate, diethylaminoethyl(meth)acrylate and dimethylaminopropyl(meth)acrylate, amide group-containing monomers such as acrylamide and methacrylamide, N-substituted amide group-containing monomers such as N-methyl(meth)acrylamide, N-ethyl(meth)acrylamide, N-methoxymethyl(meth)acrylamide, N-ethoxymethyl (meth)acrylamide, N-t-butyl(meth)acrylamide and N-octyl (meth)acrylamide, and epoxy group-containing monomers such as glycidyl methacrylate. These monomers may be used either alone or as a mixture of two or more thereof.

The acrylic copolymer having excellent pressure-sensitive adhesiveness, cohesiveness and durability can be obtained by appropriately selecting the kind and combination of the above-mentioned monomer components. As described above, the pressure-sensitive adhesive layer having arbitrary quality and characteristics depending on the use can be formed by appropriately selecting the polymer acting as a main component of the pressure-sensitive adhesive.

Although the weight average molecular weight of the polymer constituting the pressure-sensitive adhesive 2 is not particularly limited, it is, for example, from 200,000 to 1,500,000, and preferably from 400,000 to 1,000,000. When the molecular weight is too low, the adhesive force and cohesive force of the pressure-sensitive adhesive are deteriorated. When the molecular weight is too high, the pressure-sensitive adhesive becomes hard to cause insufficient pressure-sensitive adhesiveness, resulting in a tendency to deteriorate workability of laminating. Although the Tg of the polymer is not particularly limited, it is preferably −20° C. or lower. When the Tg exceeds −20° C., the pressure-sensitive adhesive becomes hard depending on the operating temperature, resulting in a failure to maintain pressure-sensitive adhesiveness in some cases.

As the pressure-sensitive adhesive 2, both of a crosslinking type and a non-crosslinking type can be used. In the case of the crosslinking type, the pressure-sensitive adhesive may contain a crosslinking agent in addition to the above-mentioned polymer. The crosslinking agent can be appropriately selected depending on the kind of crosslinkable functional group of the pressure-sensitive adhesive. Examples thereof include epoxy-based crosslinking agents, isocyanate-based crosslinking agents, metal chelate-based crosslinking agents, metal alkoxide-based crosslinking agents, metal salt-based crosslinking agents, amine-based crosslinking agents, hydrazine-based crosslinking agents, aldehyde-based crosslinking agents and the like. These crosslinking agents may be used either alone or as combination of two or more thereof.

The above-mentioned crosslinking agent is used within the range in which desired solubility in an electrolyte solvent is exhibited, depending on the composition, molecular weight and the like of the polymer constituting the pressure-sensitive adhesive. In the invention, there is preferably used a non-crosslinking type pressure-sensitive adhesive containing no crosslinking agent as a soluble pressure-sensitive adhesive constituting the pressure-sensitive adhesive layer, and a crosslinking type pressure-sensitive adhesive containing the crosslinking agent as a non-soluble pressure-sensitive adhesive, respectively.

The pressure-sensitive adhesive 2 may contain additives such as tackifiers, softeners (plasticizers), ultraviolet absorbers, fillers, antioxidants, pigments, dyes and silane coupling agents, in addition to the above, as needed. Examples of the tackifiers include rosins and derivatives thereof, polyterpenes, terpene-phenol resins, coumarone-indene resins, petroleum resins, styrene resins, xylene resins and the like. Examples of the softeners include liquid polyethers, glycol esters, liquid polyterpenes, liquid polyacrylates, phthalic acid esters, trimellitic acid esters and the like.

Examples of the ultraviolet absorbers include salicylic acid ester-based, benzotriazole-based and hydroxybenzophenone-based absorbers and the like.

Examples of the fillers include calcium carbonate silica, titanium oxide, zinc white and the like.

Examples of the antioxidants include phenolic, amine-based, sulfur-based and phosphorus-based antioxidants and the like.

Examples of the pigments include inorganic pigments such as titanium oxide and carbon black, organic pigments such as polycyclic-based (phthalocyanine-based, anthraquinone-based) and azo-based (monoazo-based, disazo-based) pigments and the like. Above all, pigments which exhibit good color development when mixed with the pressure-sensitive adhesive are preferred, and particularly, phthalocyanine blue is preferred.

Examples of the dyes include alizarin, indigotin and the like.

Examples of the silane coupling agents include methyltrimethoxysilane, dimethyldimethoxysilane and the like.

Although the thickness of the pressure-sensitive adhesive 2 is not particularly limited, it is preferably from about 5 to 100 μm, and particularly preferably from about 5 to 60 μm. Further, in the pressure-sensitive adhesive tape for battery of the invention, it is preferable that the degree of haze of the portion at which the pressure-sensitive adhesive 2 is applied is 15% or less, and the degree of haze of the portion at which the pressure-sensitive adhesive 2 is not applied is more than 15%.

Methods for adjusting the degree of haze of the portion at which the pressure-sensitive adhesive 2 is applied, that is to say, the substrate 1 include a method of embossing the surface of the substrate 1 and a method of printing a transparent ink on the surface of the substrate 1. When the pressure-sensitive adhesive 2 is applied to a part of the substrate 1 adjusted in the degree of haze by the above-mentioned methods, the pressure-sensitive adhesive 2 enters concavities on the surface of the substrate 1 to make the surface smooth. Accordingly, the degree of transparency of the portion at which the pressure-sensitive adhesive 2 is applied increases. When such a pressure-sensitive adhesive tape is attached to the adherend, an oversight of the tape decreases because the degree of haze of the portion at which the pressure-sensitive adhesive 2 is not applied is high, and it becomes easy to confirm the position at which the pressure-sensitive adhesive tape is attached, because the degree of haze of the portion at which the pressure-sensitive adhesive 2 is applied is low.

Moreover, in the pressure-sensitive adhesive tape for battery of the invention, it is also preferable that the degree of haze of the portion at which the pressure-sensitive adhesive 2 is applied is more than 15%, and the degree of haze of the portion at which the pressure-sensitive adhesive 2 is not applied is 15% or less.

In order to provide the portion coated with the pressure-sensitive adhesive 2 having a high degree of haze on the substrate 1 having a low degree of haze, there is used a method of applying to a part of the substrate 1 the pressure-sensitive adhesive 2 in which a pigment or a dye is mixed. When such a pressure-sensitive adhesive tape is attached to the adherend, an oversight of the tape decreases because the degree of haze of the portion at which the pressure-sensitive adhesive 2 is applied is high, and it becomes easy to confirm the position at which the pressure-sensitive adhesive tape is attached, because the degree of haze of the portion at which the pressure-sensitive adhesive 2 is not applied is low.

Further, in the pressure-sensitive adhesive tape for battery of the invention, the surface roughness Ra of the surface of the substrate 1 to which the pressure-sensitive adhesive 2 is applied is preferably 500 angstroms or more, more preferably 1,000 angstroms or more, and still more preferably 2,000 angstroms or more. In the case where the surface roughness Ra of the substrate is within the above-mentioned range, when the portion at which the pressure-sensitive adhesive is applied is provided on a part of the substrate, the pressure-sensitive adhesive 2 enters concavities on the surface of the substrate 1 to make the surface smooth. Accordingly, the degree of transparency of the portion at which the pressure-sensitive adhesive 2 is applied increases. Methods for adjusting the surface roughness Ra of the substrate 1 include, for example, a method of performing transfer processing on the surface of the substrate 1 to which the pressure-sensitive adhesive 2 is applied, by using a roll having an uneven surface at the time of film formation, and a method of performing a mat processing by pressing with a heating roll. Further, other methods for adjusting the surface roughness Ra of the substrate 1 include, for example, a method of projecting (blasting) fine sand (blast processing), a method of corroding the substrate with a chemical (chemical technique), and the like.

Furthermore, in the pressure-sensitive adhesive tape for battery of the invention, a mat processing with a transparent ink may be performed on the surface of the substrate 1 to which the pressure-sensitive adhesive 2 is applied. Methods for performing the mat processing on the surface of the substrate 1 with a transparent ink include, for example, a method of performing gravure printing at a rate of 200 m/min on the surface of the substrate 1 to which the pressure-sensitive adhesive 2 is applied, by introducing a transparent ink (trade name: "NB300", manufactured by Dainichiseika Color & Chemicals Mfg. Co., Ltd.) into a gravure printing machine.

Although one embodiment of the invention has been described above, the invention should not be construed as being limited thereto. For example, a functional film may be further laminated depending on the use. Furthermore, any layer may be provided in each layer of the substrate 1 and pressure-sensitive adhesive 2.

The pressure-sensitive adhesive tape for battery of the invention requires only that the pressure-sensitive adhesive 2 is applied to a part of the substrate 1, that the degree of haze of either one of a portion at which the pressure-sensitive adhesive 2 is applied and a portion at which the pressure-sensitive adhesive 2 is not applied is more than 15%, and that the degree of haze of the other one of these portions is 15% or less. Methods for applying the pressure-sensitive adhesive 2 to the substrate 1 include a method of applying the pressure-sensitive adhesive 2 to the substrate 1 in stripe form and a method of printing the pressure-sensitive adhesive 2 in dot form. After the pressure-sensitive adhesive 2 is applied on the substrate 1 by these methods, followed by drying and cooling, the substrate is taken up on a roll, and slits are formed at a predetermined width, thereby being able to produce the pressure-sensitive adhesive tape for battery of the invention. Incidentally, the pressure-sensitive adhesive tape for battery of the invention may be produced by other production methods, without being limited to these production methods.

In the pressure-sensitive adhesive tape for battery of the invention, a release film may be laminated on the pressure-sensitive adhesive layer in order to protect the pressure-sensitive adhesive, as needed. As the release film, there are usable a film commonly used in the field of pressure-sensitive adhesive tapes, for example, a paper material such as glassine paper, a film in which a release coat layer such as a silicone layer is formed on a support made of a film of a resin such as polyethylene, polypropylene or a polyester, and the like.

Further, when the pressure-sensitive adhesive tape for battery of the invention has an adhesive portion with respect to a self back surface of the tape, a back surface treatment layer may be provided on the back surface side (substrate side) of the tape for the purpose of further decreasing the adhesive force to the self back surface. The back surface treatment layer is formed by applying a release treatment agent such as a long-chain alkyl acrylate copolymer, a long-chain alkyl vinyl ether copolymer or a long-chain alkyl vinyl ester to the back surface of the substrate. The back surface treatment layer may contain the additives exemplified above in addition to the release treatment agent.

In the battery using the pressure-sensitive adhesive tape for battery of the invention, the above-mentioned pressure-sensitive adhesive tape for battery of the invention is used for insulation or protection of a battery electrode. For this reason, after the pressure-sensitive adhesive tape is attached to the battery electrode, the position at which the pressure-sensitive adhesive tape is attached can be confirmed by visual observation or a camera without delay. Working efficiency of the above-mentioned process is improved as described above, thereby being able to produce the battery in high productivity.

In the invention, the structure of the battery is not particularly limited. In general, a lithium secondary battery is constituted by a cathode active material, an anode active material and an electrolyte. As the cathode active material, there are used, for example, manganese-based compounds such as manganates (lithium manganate and the like) and manganese oxides, cobalt compounds such as cobaltates (cobalt oxides and the like), nickel-based compounds such as nickel oxides, iron-based compounds, transition metal sulfides and the like. Of these, manganese-based or cobalt-based compounds are preferred. As the anode active material, there are exemplified, for example, lithium-carbon intercalation compounds such as lithium-graphite intercalation compounds, lithium-soft carbon intercalation compounds and lithium-hard carbon intercalation compounds, and the like. The electrolytes include, for example, carbonate compounds such as ethylene carbonate, dimethyl carbonate, ethyl methyl carbonate, diethyl carbonate and propylene carbonate; ethers such as tetrahydrofuran, 4-methyl dioxolane and 1,2-dimethoxyethane; amides such as hexamethylphosphoramide; lithium salts of fluorine-containing inorganic acids such as $LiPF_6$, $LiAsF_6$ and $LiBF_4$; mixtures thereof; and the like. Preferred examples of the electrolytes include mixed solutions of carbonate compounds and lithium salts of fluorine-containing inorganic acids, and the like.

Figure 2:
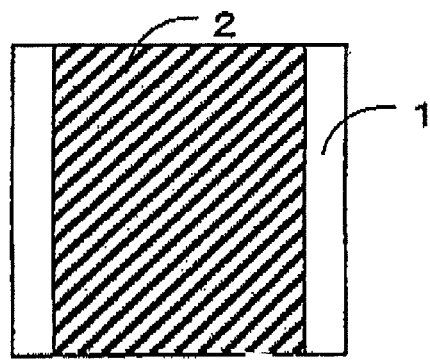
FIG. 2 is a schematic view showing a coated region pattern of a pressure-sensitive adhesive tape for battery according to another embodiment of the invention.
Figure 3:
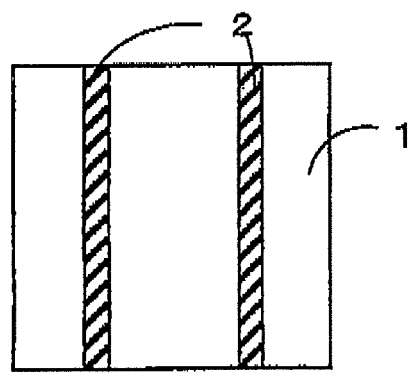
FIG. 3 is a schematic view showing a coated region pattern of a pressure-sensitive adhesive tape for battery according to still another embodiment of the invention.
Figure 4:
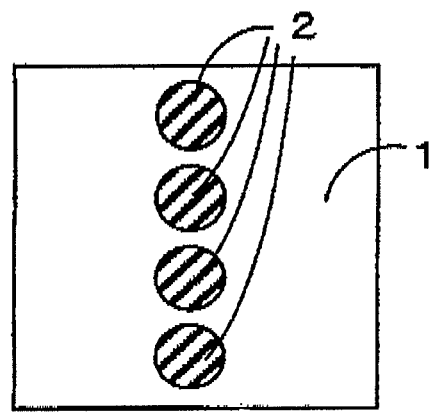
FIG. 4 is a schematic view showing a coated region pattern of a pressure-sensitive adhesive tape for battery according to a further embodiment of the invention.

Further, FIGS. 2 to 4 are schematic views showing coated region patterns of pressure-sensitive adhesive tapes according to other embodiments of the invention. In the pressure-sensitive adhesive tape of the invention, a pressure-sensitive adhesive 2 may be applied on a substrate 1 at a width narrower than that of the substrate 1, as shown in FIG. 2. Further, in the pressure-sensitive adhesive tape of the invention, a pressure-sensitive adhesive 2 may be applied on a substrate 1 at arbitrary intervals, as shown in FIG. 3. Furthermore, in the pressure-sensitive adhesive tape of the invention, a pressure-sensitive adhesive 2 may be applied on a substrate 1 so as to provide continuous circular regions, as shown in FIG. 4. Incidentally, the pressure-sensitive adhesive tape of the invention should not be construed as being limited by these embodiments.

EXAMPLES

Specific examples of the invention are described below, but the invention should not be construed as being limited thereto.

Example 1

Ninety parts by weight of butyl acrylate and 10 parts by weight of acrylic acid, based on 100 parts by weight of toluene as a diluent solvent, were copolymerized by a conventional method to obtain a solution containing acrylic acid ester-based copolymer having a weight average molecular weight of 500,000. To 100 parts by weight of this solution, 1 part by weight of trimethylolpropane tolylene diisocyanate was added as a crosslinking agent and 5 parts by weight of phthalocyanine blue was added as a pigment to obtain a solution of pressure-sensitive adhesive composition (A). This solution of pressure-sensitive adhesive composition (A) was applied on a left half of a biaxially oriented polypropylene film (trade name: "Torayfan" (registered trade mark), manufactured by Toray Industries, Inc., thickness: 30 μm) as a substrate as shown in FIG. 1, and then dried to provide a pressure-sensitive adhesive layer (thickness: 10 μm). Thereafter, a release treating agent containing 1 part by weight of a long-chain alkyl acrylate-based copolymer based on 100 parts by weight of toluene as a diluent solvent was applied to a surface of the substrate on which no pressure-sensitive adhesive layer was provided, to a thickness of less than 1 μm, and then dried to obtain a pressure-sensitive adhesive tape.

Example 2

Ninety parts by weight of butyl acrylate and 10 parts by weight of acrylic acid, based on 100 parts by weight of toluene as a diluent solvent, were copolymerized by a conventional method to obtain a solution containing acrylic acid ester-based copolymer having a weight average molecular weight of 500,000. One part by weight of trimethylolpropane tolylene diisocyanate was added as a crosslinking agent to 100 parts by weight of this solution to obtain a solution of pressure-sensitive adhesive composition (B). This solution of pressure-sensitive adhesive composition (B) was applied on a left half of a biaxially oriented polypropylene film (matte type) (trade name: "Torayfan YM11", manufactured by Toray Industries, Inc., thickness: 20 μm) as a substrate as shown in FIG. 1, and then dried to provide a pressure-sensitive adhesive layer (thickness: 10 μm). Thereafter, a release treating agent containing 1 part by weight of a long-chain alkyl acrylate-based copolymer based on 100 parts by weight of toluene as a diluent solvent was applied to a surface of the substrate on which no pressure-sensitive adhesive layer was provided, to a thickness of less than 1 μm, and then dried to obtain a pressure-sensitive adhesive tape.

Example 3

A pressure-sensitive adhesive tape was prepared in the same manner as in Example 1 with the exception that the biaxially oriented polypropylene film (trade name: "Torayfan", manufactured by Toray Industries, Inc., thickness: 30 μm) on one surface of which gravure printing with a transparent ink was performed was used as the substrate.

Comparative Example 1

A pressure-sensitive adhesive tape was prepared in the same manner as in Example 1 with the exception that pressure-sensitive adhesive composition (A) was applied all over one surface of the biaxially oriented polypropylene film (trade name: "Torayfan", manufactured by Toray Industries, Inc., thickness: 30 μm) as the substrate, Comparative Example 2

A pressure-sensitive adhesive tape was prepared in the same manner as in example 2 with the exception that pressure-sensitive adhesive composition (B) was applied all over one surface of the biaxially oriented polypropylene film (matte type) (trade name: "Torayfan YM11", manufactured by Toray Industries, Inc., thickness: 20 μm) as the substrate.

Adhesiveness Test

Each pressure-sensitive adhesive tape was attached to a SUS plate, and adhesiveness thereof was confirmed.

Measurement of Degree of Haze

The degrees of haze of the pressure-sensitive adhesive-coated portion and the pressure-sensitive adhesive-non-coated portion were measured by a haze meter (product name: "HZ-1", manufactured by Suga Test Instruments Co., Ltd.).

Measurement of Surface Roughness

The surface roughness of the substrate was measured by using a surface roughness tester (P-11 Long Scan Surface Profiler, manufactured by KLA-Tencor Corporation) under conditions of a scan speed of 100 μm/sec and a measuring area of 1.0 mm×2.0 mm.

Evaluation of Recognizability

Figure 5:
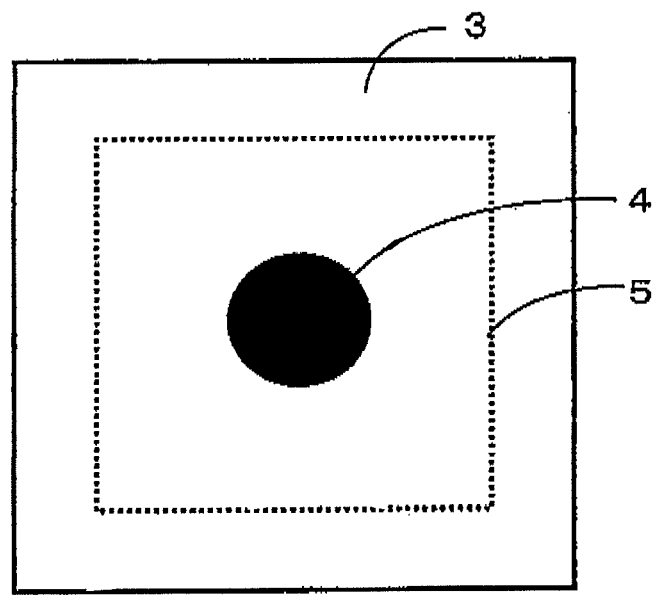
FIG. 5 is a view showing an adherend having a mark at a center part thereof and a position at which a pressure-sensitive adhesive tape is attached, which are used in a recognizability test of the pressure-sensitive adhesive tape in Examples.

Each pressure-sensitive adhesive tape was attached on an adherend 3 having a mark 4 at a center part thereof as shown in FIG. 5, along a tape-attaching position 5, and recognizability of the tape and recognizability of the mark of the adherend were visually evaluated. For the evaluation of the recognizability of the tape, when the presence of the pressure-sensitive adhesive tape could be visually confirmed after the pressure-sensitive adhesive tape was attached to the adherend 3 along the tape-attaching position 5, the tape was evaluated as "good", and when the pressure-sensitive adhesive tape could not be confirmed, the tape was evaluated as "difficult". Further, for the evaluation of the recognizability of the mark of the adherend, when a half or the whole of the mark 4 of the adherend 3 could be confirmed after the pressure-sensitive adhesive tape was attached to the adherend 3 along the tape-attaching position 5, the tape was evaluated as "good", and when the mark 4 of the adherend 3 could not be confirmed at all, the tape was evaluated as "difficult". The results thereof are shown in Table 1.

TABLE 1

| | | Degree of Haze | | | Recognizability | |
| | | Pressure-Sensitive | Pressure-Sensitive | Surface Roughness | | |
| | Adhesiveness | Adhesive-Coated Portion | Adhesive-Non-Coated Portion | of Substrate Ra | Tape | Mark of Adherend |
| --- | --- | --- | --- | --- | --- | --- |
| Example 1 | Good | 25% | 2% | 300 angstroms | Good | Good |
| Example 2 | Good | 6% | 70% | 1,550 angstroms | Good | Good |
| Example 3 | Good | 6% | 65% | 3,670 angstroms | Good | Good |
| Comparative Example 1 | Good | 25% | — | 300 angstroms | Good | Difficult |
| Comparative Example 2 | Good | 6% | — | 1,550 angstroms | Difficult | Good |

As shown in Table 1, in each of the pressure-sensitive adhesive tapes of Example 1 to 3, since the portion having a degree of haze of more than 15% and the portion having a degree of haze of 15% or less were present, it was confirmed that the recognizability of the tape itself and the recognizability of the mark of the adherend were good. Compared with this, in the pressure-sensitive adhesive tape of Comparative Example 1, since the degree of haze of the whole tape was more than 15%, although the recognizability of the tape itself was good, the recognizability of the mark of the adherend was difficult. Further, in the pressure-sensitive adhesive tape of Comparative Example 2, since the degree of haze of the whole tape was 15% or less, although the recognizability of the mark of the adherend was good, it was difficult to confirm a position of the tape attached to the adherend, so that the recognizability of the tape was difficult.

While the present invention has been described in detail and with reference to specific embodiments thereof, it will be apparent to one skilled in the art that various changes and modifications can be made therein without departing from the scope thereof.

This application is based on Japanese patent application No. 2009-047570 filed Mar. 2, 2009, the entire contents thereof being hereby incorporated by reference.

Further, all references cited herein are incorporated in their entireties.

What is claimed is:

1. A pressure-sensitive adhesive tape for battery, which comprises a substrate and a pressure-sensitive adhesive applied on at least one surface of the substrate,
wherein the pressure-sensitive adhesive is applied on a part of the substrate, and
wherein either one of a portion at which the pressure-sensitive adhesive is applied and a portion at which the pressure-sensitive adhesive is not applied has a degree of haze of more than 15%, and the other one of said portions has a degree of haze of 15% or less.

2. The pressure-sensitive adhesive tape for battery according to claim 1, wherein the degree of haze of the portion at which the pressure-sensitive adhesive is applied is 15% or less.

3. The pressure-sensitive adhesive tape for battery according to claim 1, wherein the degree of haze of the portion at which the pressure-sensitive adhesive is applied is more than 15%.

4. The pressure-sensitive adhesive tape for battery according to claim 1, wherein a surface of the substrate to which the pressure-sensitive adhesive is applied has a surface roughness Ra of 500 angstroms or more.

5. The pressure-sensitive adhesive tape for battery according to claim 1, wherein a surface of the substrate to which the pressure-sensitive adhesive is applied has been subjected to a mat processing with a transparent ink.

6. A battery using the pressure-sensitive adhesive tape for battery according to claim 1.

* * * * *